(12) United States Patent
Bates et al.

(10) Patent No.: US 8,762,776 B2
(45) Date of Patent: Jun. 24, 2014

(54) RECOVERING FROM A THREAD HANG

(75) Inventors: Cary L. Bates, Rochester, MN (US);
Nicholas P. Johnson, Rochester, MN (US); Justin K. King, Rochester, MN (US); Lee Nee, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/344,124

(22) Filed: Jan. 5, 2012

(65) Prior Publication Data

US 2013/0179731 A1 Jul. 11, 2013

(51) Int. Cl.
*G06F 11/00* (2006.01)

(52) U.S. Cl.
USPC .............. 714/23; 714/10; 714/25; 714/48

(58) Field of Classification Search
USPC .......................... 714/25, 47.1, 38.1
See application file for complete search history.

(56) References Cited

U.S. PATENT DOCUMENTS

| | | | |
|---|---|---|---|
| 7,093,262 B2 | 8/2006 | Ma et al. | |
| 7,165,254 B2 | 1/2007 | Yoshida | |
| 7,725,685 B2 | 5/2010 | Floyd et al. | |
| 7,870,440 B2 | 1/2011 | Vacar et al. | |
| 8,453,013 B1 * | 5/2013 | Chen | 714/15 |
| 2007/0294693 A1 | 12/2007 | Barham | |
| 2009/0204948 A1 | 8/2009 | Krauss | |
| 2009/0300644 A1 | 12/2009 | Lee et al. | |
| 2010/0169895 A1 | 7/2010 | Dice et al. | |
| 2010/0185903 A1 | 7/2010 | Horn et al. | |
| 2012/0030657 A1 * | 2/2012 | Gao et al. | 717/128 |

FOREIGN PATENT DOCUMENTS

| | | |
|---|---|---|
| JP | 59003610 | 1/1984 |
| JP | 64059552 | 3/1989 |

* cited by examiner

*Primary Examiner* — Sarai Butler
(74) *Attorney, Agent, or Firm* — Toler Law Group

(57) ABSTRACT

A method, computer-readable storage medium, and computer system are provided. In an embodiment, a detection is made that at least one thread, in a plurality of threads executing in a computer, has hung. A lock order of a plurality of locks used by the plurality of threads is determined. A determination is made that a first thread in the plurality of threads violates the lock order. After the determination that the first thread violates the lock order, the computer is restarted and the first thread that violates the lock order is scheduled on a reduced-speed processor.

20 Claims, 6 Drawing Sheets

156

LOCK ORDER

| THREAD IDS (510) | LOCK ORDER (512) | |
|---|---|---|
| THREAD A, THREAD B, THREAD C | LOCK A, LOCK B, LOCK C | 502 |
| THREAD D, THREAD E, THREAD F, THREAD G | LOCK D, LOCK E | 504 |

SAVED COLLECTION

| THREAD ID(S) OF HUNG THREAD(S) (610) | ACTION (612) | |
|---|---|---|
| THREAD C, THREAD D, THREAD E | SLOW THREAD C BY 10% | 602 |
| THREAD A, THREAD B, THREAD C | SLOW THREAD B BY 5% | 604 |

FIG. 6

RECOVERING FROM A THREAD HANG

FIELD

An embodiment of the invention generally relates to computer systems and more particularly to computer systems that execute threads.

BACKGROUND

Computer systems typically comprise a combination of computer programs and hardware, such as semiconductors, transistors, chips, circuit boards, storage devices, and processors. The computer programs are stored in the storage devices and are executed by the processors.

Computers typically comprise a hierarchy of storage devices, with some storage devices being relatively smaller, faster, and more expensive while other storage devices are relatively larger, slower, and less expensive (on a per storage unit basis). Some of these storage devices are volatile, meaning that they lose their data when electrical power is interrupted while other storage devices are non-volatile, meaning that they retain their data across electrical power interruptions. The processors typically execute instructions stored in the smaller, faster, volatile storage devices, so programs are copied from the larger, slower non-volatile storage devices, in order to execute.

When a computer initially receives electrical power, a program called a boot loader executes and performs a bootstrap, boot up, boot load, or IPL (Initial Program Load) sequence, which copies programs or portions of programs, such as an operating system and device drivers, from the larger, slower non-volatile storage devices to the smaller, faster volatile storage devices and starts them executing. Once this IPL sequence is complete, the operating system and device drivers are executing and ready to respond to requests from other programs, which are called applications. The programs may execute on the processor in threads and own and wait for locks on shared resources.

SUMMARY

A method, computer-readable storage medium, and computer system are provided. In an embodiment, a detection is made that at least one thread, in a plurality of threads executing in a computer, has hung. A lock order of a plurality of locks used by the plurality of threads is determined. A determination is made that a first thread in the plurality of threads violates the lock order. After the determination that the first thread violates the lock order, the computer is restarted and the first thread that violates the lock order is scheduled on a reduced-speed processor.

BRIEF DESCRIPTION OF THE SEVERAL VIEWS OF THE DRAWINGS

FIG. 5 depicts a block diagram of an example data structure for a lock order, according to an embodiment of the invention.

FIG. 6 depicts a block diagram of an example data structure for a saved collection, according to an embodiment of the invention.

It is to be noted, however, that the appended drawings illustrate only example embodiments of the invention, and are therefore not considered a limitation of the scope of other embodiments of the invention.

DETAILED DESCRIPTION

Figure 1:
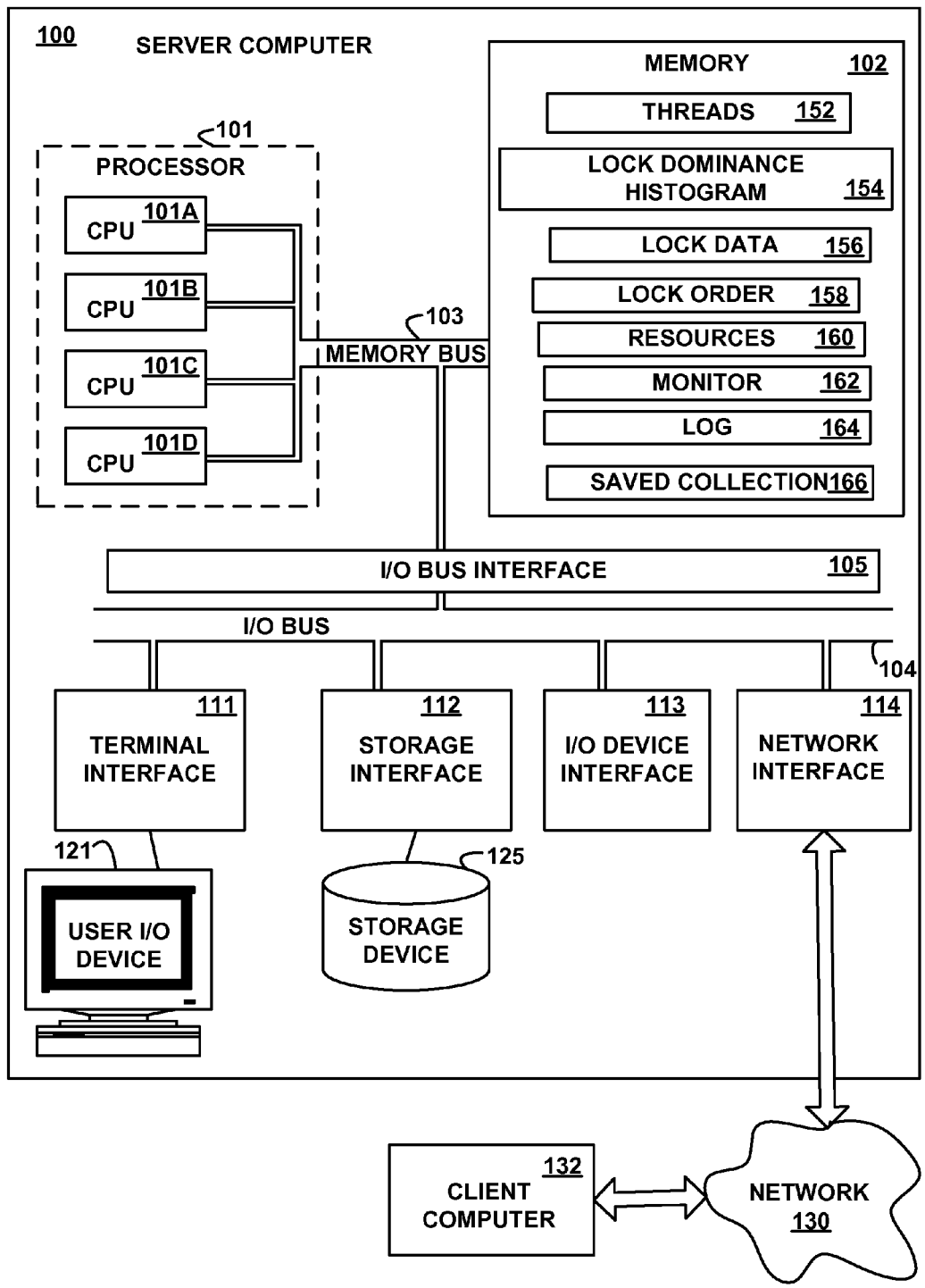
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium (either volatile or non-volatile) for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes threads 152, a lock dominance histogram 154, lock data 156, a lock order 158, resources 160, a monitor 162, a log 164, and a saved collection 166. Although the threads 152, the lock dominance histogram 154, the lock data 156, the lock order 158, the resources 160, the monitor 162, the log 164, and the saved collection 166 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the threads 152, the lock dominance histogram 154, the lock data 156, the lock order 158, the resources 160, the monitor 162, the log 164, and the saved collection 166 are illustrated as being contained within the main memory 102, these elements are not necessarily all completely contained in the same storage device at the same time. Further, although the threads 152, the lock dominance histogram 154, the lock data 156, the lock order 158, the resources 160, the monitor 162, the log 164, and the saved collection 166 are illustrated as being separate entities, in other embodiments some of them, portions of some of them, or all of them may be packaged together.

In an embodiment, the threads 152 and the monitor 162 comprise instructions or statements that execute on the processor 101 or instructions or statements that are interpreted by instructions or statements that execute on the processor 101, to carry out the functions as further described below with reference to FIGS. 2, 3, 4, 5, 6 and 7. In another embodiment, the threads 152 and/or the monitor 162 are implemented in hardware via semiconductor devices, chips, logical gates, circuits, circuit cards, and/or other physical hardware devices in lieu of, or in addition to, a processor-based system. In an embodiment, the threads 152 and/or the monitor 162 comprise data in addition to instructions or statements. In various embodiments, the threads 152 may be implemented by user applications, third-party applications, operating system, device drivers, partitions, virtual machines, classes, methods, procedures, sub-procedures, or any portion, multiple, or combination thereof. The threads 152 are executed simultaneously or concurrently by one or more of the processors 101 via multi-threading, multi-processing, or multi-programming techniques. In various embodiments, the threads 152 may comprise identical or different instructions.

In an embodiment, the threads 152 are IPL threads that execute during an IPL sequence. The threads 152 request, acquire, own, and/or wait on exclusive locks of the resources 160. In various embodiments, the resources 160 may be implemented as files, directories, sub-directories, databases, database tables, fields, columns, rows, entries, or any unit of the memory 102. Although the resources 160 are illustrated as being contained within the memory 102, in other embodiments, the resources may be implemented as the terminal interface 111, the storage interface 112, the I/O device 113, the network interface 114, bandwidth of the network interface 114, any device connected to the interfaces 111, 112, 113, or 114, or time slices of the processor 101.

The locks acquired or owned by the threads 152 may be of any type, such as a read lock, a write lock, an update lock, or any combination thereof, which gives the owning thread the exclusive capability to perform a read, write, or update operation, respectively, to the locked resource. A thread acquiring or owning an exclusive lock on the resources 160 means that no other thread may acquire the lock on the locked resource until the owning thread releases the lock. Thus, a thread that desires to lock a resource but cannot because the resource is already locked by another thread must wait on the lock, meaning that the execution of the waiting thread halts and does not make execution progress until the owning thread releases the lock and the waiting thread obtains the lock.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
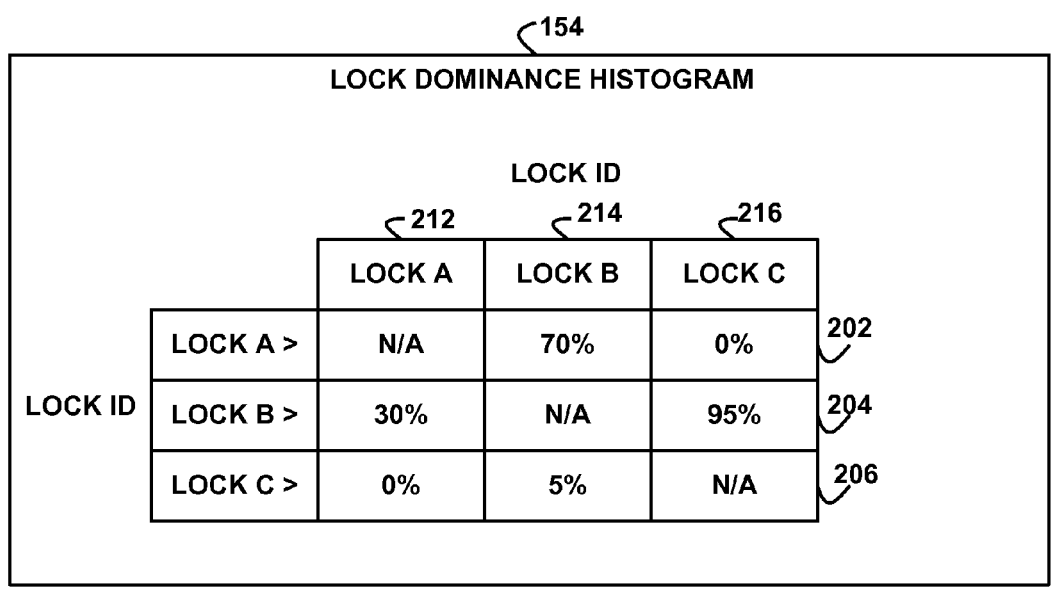
FIG. 2 depicts a block diagram of an example data structure for a lock dominance histogram, according to an embodiment of the invention.

FIG. 2 depicts a block diagram of an example data structure for a lock dominance histogram 154, according to an embodiment of the invention. The lock dominance histogram 154 comprises example cells formed by the intersection of example rows 202, 204, and 206 and example columns 212, 214, and 216, which represent lock identifiers (such as the example lock identifiers lock A, lock B, and lock C) that identify locks of different of the resources 160. Although the lock dominance histogram 154 comprises nine cells formed by the intersection of the three rows 202, 204, and 206 and the three columns 212, 214, and 216 representing three different lock identifiers (lock A, lock B, and lock C), in other embodiments any number of cells and lock identifiers may be present. The cells identify the percentage of times (over all threads 152) that the first lock (identified in the rows 202, 204, and 206) dominates a second lock (identified in the columns 212, 214, and 216) while the first and second lock were requested, obtained, held, and/or released by the same thread.

A first lock dominates a second lock (and the second lock is dominated by the first lock) in a thread if the thread obtained the first lock before obtaining the second lock and released the first lock after releasing the second lock. If the thread obtained the first lock after obtaining the second lock, then the first lock does not dominate the second lock in the thread. If the thread obtained the first lock before obtaining the second lock and released the first lock before releasing the second lock, then the first lock does not dominate the second lock in the thread.

Lock A has no lock dominance percentage with respect to lock A, lock B has no dominance percentage with respect to lock B, and lock C has no dominance percentage with respect to lock C (the cells formed by the intersection of row 202 and column 212, row 204 and column 214, and row 206 and column 216 specify "N/A" or not applicable) because a lock cannot dominate itself.

As indicated by the cell formed by the intersection of row 202 and column 214, lock A dominated lock B 70% of the time when locks A and B are held by the same thread. As indicated by the cell formed by the intersection of row 202 and column 216, lock A dominated lock C 0% of the time when locks A and C are held by the same thread. As indicated by the cell formed by the intersection of row 204 and column 212, lock B dominated lock A 30% of the time when locks A and B are held by the same thread. As indicated by the cell formed by the intersection of row 204 and column 216, lock B dominated lock C 95% of the time when locks B and C are held by the same thread. As indicated by the cell formed by the intersection of row 206 and column 212, lock C dominated lock A 0% of the time when locks A and C are held by the same thread. As indicated by the cell formed by the intersection of row 206 and column 214, lock C dominated lock B 5% of the time when locks B and C are held by the same thread.

Figure 3:
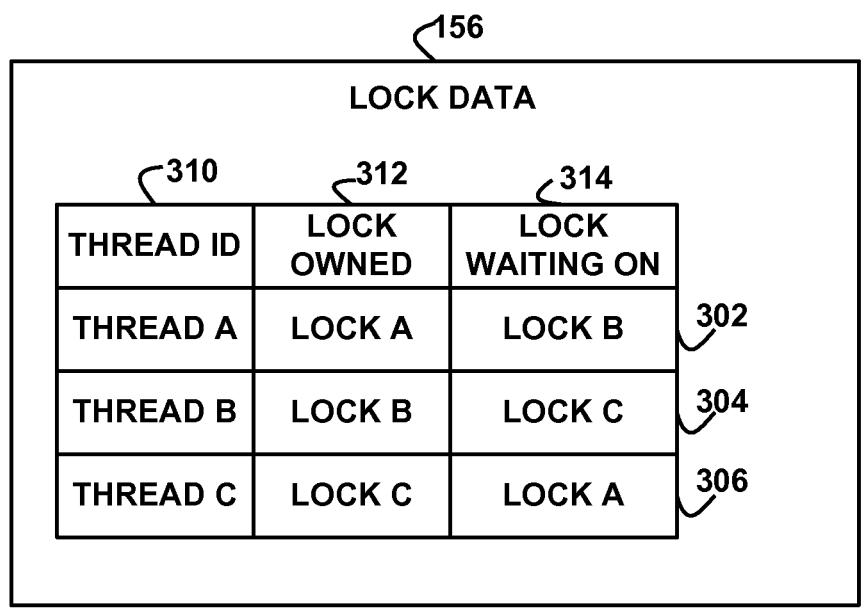
FIG. 3 depicts a block diagram of an example data structure for lock data, according to an embodiment of the invention.

FIG. 3 depicts a block diagram of an example data structure for lock data 156, according to an embodiment of the invention. The example lock data 156 comprises example entries 302, 304, and 306, each of which comprises an example thread identifier field 310, an example lock owned field 312, and an example lock waiting-on field 314. The thread identifier field 310 uniquely identifies, for each entry, one of the threads 152. The lock owned field 312 identifies, in each entry, the lock(s) currently owned by the thread identified by the thread identifier 310, in the same entry. The lock waiting-on field 314 identifies, in each entry, the locks which the thread identified by the thread identifier 310 is currently waiting on, in the same entry. The threads 152, the monitor 162, or another component such as an operating system, update the lock data 156, in response to the threads 152 requesting, acquiring, and/or waiting-on locks, so that the lock data 156 represents the current state of the locks owned and waiting on for each thread. In the example of FIG. 3, the entry 302 indicates that thread A owns the lock A and is waiting on the lock B; the entry 304 indicates that the thread B owns the lock B and is waiting on the lock C; and the entry 306 indicates that the thread C owns the lock C and is waiting on the lock A.

Thus, the lock data 156 identifies, for each thread, a first respective subset of the of locks that each respective thread owns and a second respective subset of the locks that each thread waits on. The monitor 162 determines the lock data 156 and uses the lock data 156 to determine that a thread violates a lock order by determining that the thread owns a first lock (identified by the lock owned field 312) and waits on a second lock (identified by the lock waiting on field 314), where the first lock is later than the second lock in a lock order.

Figure 4:
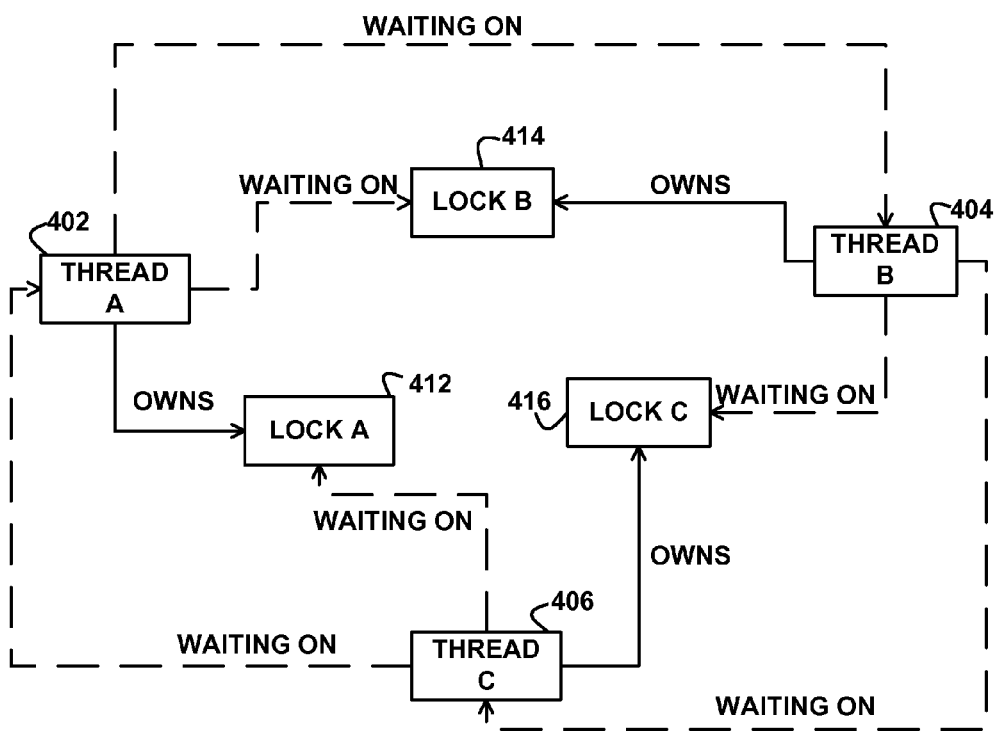
FIG. 4 depicts a block diagram of an example graphical depiction of lock data, according to an embodiment of the invention.

FIG. 4 depicts a block diagram of an example graphical depiction of the lock data 156 of FIG. 3, according to an embodiment of the invention. The thread A 402 waits on the lock B 414 and owns the lock A 412, which represents the entry 302 in the lock data 156. The thread B 404 owns the lock B 414 and waits on the lock C 416, which represents the entry 304 in the lock data 156. The thread C 406 owns the lock C 416 and waits on the lock A 412, which represents the entry 306 in the lock data 156. The graphic depiction of FIG. 3 makes it easy to see that the lock wait conditions of the threads are circular, so the thread A 402, the thread B 404, and the thread C 406 are hung or deadlocked. That is, the thread A 402 waits on the lock B 414, which is owned by the thread B 404, which waits on the lock C 416, which is owned by the thread C 406, which waits on the lock A 412, which is owned by the thread A 402. As depicted in FIG. 4, the threads 152 are deadlocked because none of the threads 152 will ever release their owned locks, so no other thread can ever obtain the lock on which it waits.

Thus, the thread A 402 is hung, waiting on the thread B 404, which is hung waiting on the thread C 406, which is hung waiting on the thread A 402, in a never-ending circle. In an embodiment, threads 152 are hung when the threads 152, as represented by points on a circle or nodes in a graph, are connected via links representing the wait by the node (thread) held by another node (thread) to which the link (wait) connects the node (thread), and where a sequence of nodes and links (threads and waits) begins and ends with the same node (thread). Thus, for example, the sequence of thread A 402, wait on lock B 414, thread B 404, wait on lock C 416, thread C 406, wait on lock A 412, thread A 402 begins and ends with the same thread, which is the thread A 402.

FIG. 5 depicts a block diagram of an example data structure for a lock order 158, according to an embodiment of the invention. The lock order 158 comprises example entries 502 and 504, each of which comprises an example thread identifiers field 510 and an example lock order field 512. The thread identifiers field 510 identifies threads 152 that concurrently execute on the processor 101. The lock order 512 identifies either an inferred lock order or an explicit lock order used by the threads 152 identified by the thread identifiers field 510, in the same entry. The monitor 162 infers an inferred lock order from the lock dominance histogram 154. The monitor 162 reads an explicit lock order from the memory 102 or receives an explicit lock order from a user or a designer or developer of the threads 152 via the user I/O device 121 or from the client computer 132 via the network 130.

FIG. 6 depicts a block diagram of an example data structure for a saved collection 166, according to an embodiment of the invention. The saved collection 166 comprises example entries 602 and 604, each of which comprises an example thread identifier of hung thread(s) field 610 and an action field 612. The thread identifier(s) of hung thread(s) field 610 identifies the threads 152 that, in the past on some computer, were hung, deadlocked, or were not making execution progress. The computer on which the threads 152 executed in the past may be the same or different from the computer 100 on which the monitor 162 executes. The action field 612 identifies the action taken in the past on the same or different computer that caused the threads 152 identified by the thread identifiers 610, in the same entry, to no longer be hung on an IPL subsequent to the IPL during which the threads 152 hung. In various embodiments, the action field 612 may specify thread identifiers and the processor speeds at which the threads 152 were executed on the subsequent IPL or an amount or percentage speed difference from the previous IPL.

Figure 7:
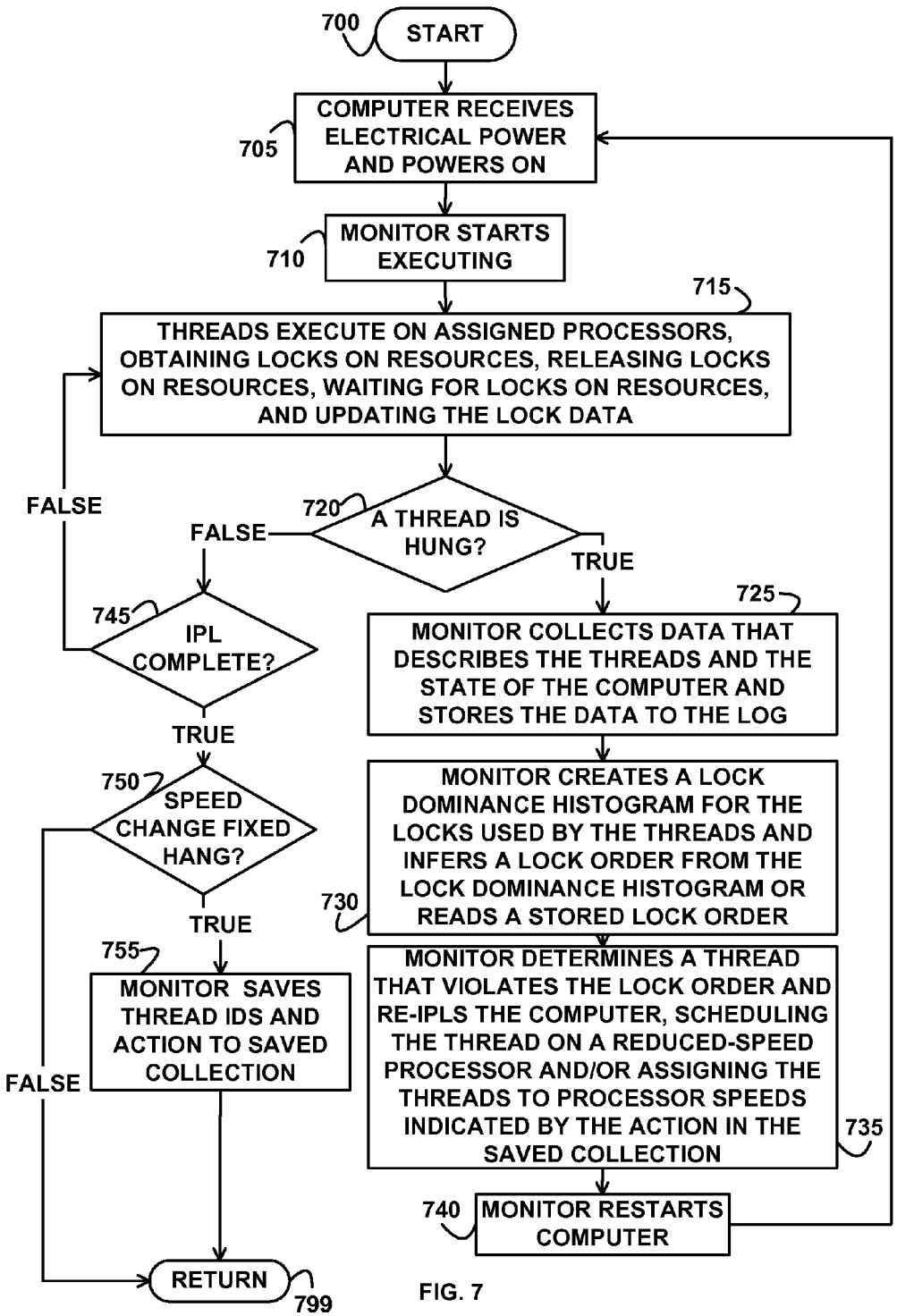
FIG. 7 depicts a flowchart of example processing for an IPL (Initial Program Load) of a computer, according to an embodiment of the invention.

FIG. 7 depicts a flowchart of example processing for an IPL (Initial Program Load) of a computer, according to an embodiment of the invention. Control begins at block 700. Control then continues to block 705 where the computer 100 receives electrical power and begins a power on and IPL sequence. Control then continues to block 710 where the monitor 162 starts executing on the processor 101. Control then continues to block 715 where the threads 152 execute on their assigned processors. The threads 152 obtain locks on resources 160, access (read/write/update/delete) data in the locked resources 160, release locks on resources 160, wait for locks on resources 160 held by other threads 152, and update the lock data 156 in response to the obtaining of locks, releasing of lock, and waiting-on locks.

Control then continues to block 720 where the monitor 162 determines whether one or more of the executing threads 152 are hung. In various embodiments, the monitor 162 makes the determination of block 720 by determining whether status, progress checkpoint, or heartbeat messages are periodically received from the threads 152. So long as the monitor 162 continues receiving the messages from a thread, the monitor 162 considers the thread to not be hung. If the monitor 162 does not receive such a message from a thread during a period of time, then the monitor 162 considers the thread to be hung. In another embodiment, the monitor 162 determines that a thread has hung by detecting a circular lock wait condition, such as was previously described above with reference to FIGS. 3 and 4. In another embodiment, the monitor 162 determines whether thread starvation has occurred. Thread starvation occurs if few (less than a threshold number) processor cycles are available to execute a thread. If thread starvation has occurred, then the thread is hung. If thread starvation has not occurred, then the thread has not hung. In other embodiments, any appropriate technique may be used to determined whether a thread has hung.

If the determination at block 720 is true, then or more of the threads 152 are hung, so control continues to block 725 where the monitor 162 collects data that describes the threads 152 and the state of the computer and stores the data to the log 164.

Control then continues to block 730 where the monitor 162 creates and stores a lock dominance histogram 154 for the locks used by the hung threads 152. The monitor 162 calculates a percentage of time that each of the locks used by the hung threads 152 is acquired by the hung threads 152 before and released after other of the locks and stores the percentages in the cells of the lock dominance histogram 154. The monitor 162 further infers a lock order from the lock dominance histogram 154 or reads a stored explicit lock order. The monitor 162 infers the inferred lock order by determining an ordered series of locks from the lock dominance histogram 154, where each respective lock in the ordered series dominates a next respective lock in the series a higher percentage of time than each respective lock is dominated by the next respective lock in the series. Using the example of FIG. 2, the inferred lock order is lock A, followed by lock B, followed by lock C. Lock A is before lock B in the inferred lock order because lock A dominates lock B 70% of the time, lock B dominates lock A 30%, and 70% is greater than 30%. Lock B is before lock C in the inferred lock order because lock B dominates lock C 95% of the time, lock C dominates lock B 5% of the time, and 95% is greater than 5%.

Control then continues to block 735 where the monitor 162 determines a thread that violates the inferred or explicit lock order and re-IPLs the computer, scheduling the determined thread on a reduced-speed processor and/or assigning the threads 152 to processor speeds indicated by the action in the entry in the saved collection 166 whose hung thread identifiers 610 match (are identical to) the threads 152 that are hung in the computer 100. The monitor 162 determines a thread that violates the lock order by determining that a thread owns a first lock and waits on a second lock, where the first lock is later than the second lock in the lock order. If the second lock is later than the first lock, then the thread does not violate the lock order. The monitor 162 uses the entry for the hung thread in the lock data 156 and the lock order 512 for the hung threads 152 to make the determination. In an embodiment, the monitor 162 uses Dynamic Voltage and Frequency Scaling (DVFS) Processor-States to causes the threads 152 to execute at altered processor frequencies. Since the processor frequencies are different on the next IPL, the timing windows and interleaving of the hung threads 152 will change on the next IPL. In an embodiment, the frequency variations are sufficient to alter small timing windows that exist between the threads 152.

In an embodiment, executing the threads that violate the lock order on a slower processor means that threads that do follow (do not violate) the lock order may execute through critical sections of their code before the violating thread is able to cause a problem and increases the likelihood that the next IPL successfully completes. Both successful and failing IPL attempts after a processor speed change may provide useful debugging information to the developer of the threads 152. If the change in processor speed allows the IPL to succeed, then the customer of the computer 100 now has a functioning computer system without a need for development workarounds, and the developer has evidence of a small timing window. If the change in the processor speed does not allow the IPL to succeed, the monitor 162 may perform further speed variations on subsequent IPLs. If the IPL never succeeds, this suggests to the developer that the hang is not caused by a small timing window, which may allow the hang condition to be more easily re-created by the developer.

Control then continues to block 740 where the monitor 162 restarts the computer 100. In various embodiments, restarting the computer comprises a power off and then power on cycle of the computer 100, a re-boot of the computer, a re-IPL of the computer 100, or an interruption of electrical power to the computer 100 followed by resumption of electrical power to the computer 100. In response to the restart of the computer 100, the threads 152 are scheduled to run on the processors at the speeds determined by the logic of block 735. Control then returns to block 705, as previously described above.

If the determination at block 720 is false, then none of the threads 152 in the computer 100 are hung, so control continues to block 745 where the monitor 162 determines whether the IPL sequence is complete. In various embodiment, the IPL sequence is complete when the boot loader completes execution or when all of the threads 152 complete execution. If the determination at block 745 is true, then the IPL sequence is complete, so control continues to block 750 where the monitor 162 determines whether a change to the processor speed of the threads 152 on the current IPL fixed a hang problem that occurred for the threads 152 on a previous IPL.

If the determination at block 750 is true, then a change to the processor speed of the threads 152 on the current IPL of the computer 100 fixed a hang problem that occurred for the threads 152 on a previous IPL of the computer 100, so control continues to block 755 where the monitor 162 saves to the saved collection 166 the thread identifiers and the action. Thus, if the restarting the computer and scheduling a thread that violates the lock order on a reduced-speed processor fixes the hung condition for the thread, then the monitor 162 saves an identifier of the threads 152, the speed of the reduced-speed processor and/or the speeds of the processors for all threads 152 to the saved collection 166. The same or a different computer may use the saved collection 166 to fix a hung thread condition of threads 152 with identifiers that match the identifiers of the threads 152 that were hung on the previous IPL. Control then continues to block 799 where the logic of FIG. 7 returns.

If the determination at block 750 is false, then a change to the processor speed of the threads 152 on the current IPL did not fix a hang problem that occurred for the threads 152 on a previous IPL or a previous IPL did not encounter a hang problem for the threads 152 or no change to the processor speed for the threads 152 occurred, so control continues to block 799 where the logic of FIG. 7 returns without saving an action to the saved collection 166.

If the determination at block 745 is false, then the IPL is not yet complete, so control returns to block 715 where the threads 152 continue to execute on their assigned processors, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   detecting that at least one thread in a plurality of threads executing in a computer has hung;
   determining a lock order of a plurality of locks used by the plurality of threads;
   determining that a first thread in the plurality of threads violates the lock order, wherein the first thread is executing on a first processor of the computer, wherein the first processor has a first processor speed; and
   after the determining that the first thread violates the lock order, restarting the computer and scheduling the first thread that violates the lock order on a second processor of the computer, wherein the second processor has a second processor speed, and wherein the second processor speed is less than the first processor speed.

2. The method of claim 1, wherein determining the lock order of the plurality of locks used by the plurality of threads comprises reading an explicit lock order.

3. The method of claim 1, wherein determining the lock order of the plurality of locks used by the plurality of threads comprises:
   creating a lock dominance histogram for the plurality of locks used by the plurality of threads; and
   determining the lock order of the plurality of locks based on the lock dominance histogram.

4. The method of claim 3, wherein creating the lock dominance histogram comprises calculating a percentage of time that each of the plurality of locks is acquired before and released after other of the plurality of locks.

5. The method of claim 3, wherein determining the lock order further comprises determining an ordered series of the plurality of locks, wherein the ordered series is based on a percentage of time that each lock in the plurality of locks dominates a subsequent lock in the ordered series.

6. The method of claim 3, wherein determining the lock order of the plurality of locks comprises determining a first respective subset of the plurality of locks that each thread owns and a second respective subset of the plurality of locks that each thread waits on.

7. The method of claim 1, wherein determining that the first thread in the plurality of threads violates the lock order comprises determining that the first thread owns a first lock and waits on a second lock, wherein the first lock is later than the second lock in the lock order.

8. The method of claim 1, further comprising, in response to restarting the computer and scheduling the first thread that violates the lock order on the second processor, fixing the at least one thread that has hung and saving a first identifier of the first thread, the speed of the second processor, and identifiers of the plurality of threads to a saved collection, wherein another computer uses the saved collection to fix a hung thread with a second identifier that matches the first identifier of the first thread.

9. A computer-readable storage device encoded with instructions, wherein the instructions when executed by a computer cause the computer to perform operations including:
   detecting that at least one thread in a plurality of threads executing in a computer has hung;
   determining a lock order of a plurality of locks used by the plurality of threads, wherein the determining the lock order of the plurality of locks used by the plurality of threads further comprises creating a lock dominance histogram for the plurality of locks used by the plurality of threads and determining the lock order of the plurality of locks based on the lock dominance histogram;
   determining that a first thread in the plurality of threads violates the lock order, wherein the first thread is executed on a first processor of the computer wherein the first processor has a first processor speed; and
   after the determining that the first thread violates the lock order, restarting the computer and scheduling the first thread that violates the lock order on a second processor of the computer, wherein the second processor has a second processor speed, wherein the second processor speed is less than the first processor speed.

10. The computer-readable storage device of claim 9, wherein creating the lock dominance histogram comprises calculating a percentage of time that each of the plurality of locks is acquired before and released after other locks of the plurality of locks.

11. The computer-readable storage device of claim 9, wherein determining the lock order comprises determining an ordered series of the plurality of locks, wherein the ordered series is based on a percentage of time that each lock in the plurality of locks dominates a subsequent lock in the ordered series.

12. The computer-readable storage device of claim 9, wherein the determining the lock order of the plurality of locks comprises determining a first respective subset of the plurality of locks that each thread owns and a second respective subset of the plurality of locks that each thread waits on.

13. The computer-readable storage device of claim 9, wherein determining the first thread of the plurality of threads violates the lock order comprises determining that the first thread owns a first lock and waits on a second lock, wherein the first lock is later than the second lock in the lock order.

14. The computer-readable storage device of claim 9, further comprising, in response to restarting the computer and scheduling the first thread that violates the lock order on the second processor, fixing the at least one thread that has hung and saving a first identifier of the first thread, the speed of the second processor, and identifiers of the plurality of threads to a saved collection, wherein another computer uses the saved collection to fix a hung thread with a second identifier that matches the first identifier of the first thread.

15. A computer system comprising:
   processors; and
   memory communicatively coupled to the processors, wherein the memory is encoded within instructions, wherein the instructions when executed by the processors cause the processors to perform operations including:
      detecting that at least one thread in a plurality of threads executing in the computer system has hung;
      determining a lock order of a plurality of locks used by the plurality of threads, wherein the determining the lock order of the plurality of locks used by the plurality of threads further comprises creating a lock dominance histogram for the plurality of locks used by the plurality of threads and determining the lock order of the plurality of locks based on the lock dominance histogram;
      determining that a first thread in the plurality of threads violates the lock order, wherein the first thread is executed on a first processor of the processors, and wherein the first processor has a first processor speed; and after the determining that the first thread violates the lock order, restarting the computer system and scheduling the first thread that violates the lock order on a second processor of the processors, wherein the second processor has a second processor speed, and wherein the second processor speed is less than the first processor speed.

16. The computer system of claim 15, wherein creating the lock dominance histogram comprises calculating a percentage of time that each of the plurality of locks is acquired before and released after other of the plurality of locks.

17. The computer system of claim 15, wherein the determining the lock order comprises determining an ordered series of the plurality of locks, wherein the ordered series is based on a percentage of time that each lock in the plurality of locks dominates a subsequent lock in the ordered series.

18. The computer system of claim 15, wherein the determining the lock order of the plurality of locks comprises determining a first respective subset of the plurality of locks that each thread owns and a second respective subset of the plurality of locks that each thread waits on.

19. The computer system of claim 15, wherein determining the first thread of the plurality of threads violates the lock order comprises determining that the first thread owns a first lock and waits on a second lock, wherein the first lock is later than the second lock in the lock order.

20. The computer system of claim 15, wherein the instructions further comprise, in response to restarting the computer and scheduling the first thread that violates the lock order on the second processor, fixing the at least one thread that has hung and saving a first identifier of the first thread, the speed of the second processor, and identifiers of the plurality of threads to a saved collection, wherein another computer uses the saved collection to fix a hung thread with a second identifier that matches the first identifier of the first thread.

* * * * *